United States Patent
Bram et al.

(10) Patent No.: US 10,486,385 B2
(45) Date of Patent: Nov. 26, 2019

(54) METHOD FOR PRODUCING METAL OR CERAMIC COMPONENTS AND COMPONENTS

(71) Applicant: Forschungszentrum Juelich GmbH, Juelich (DE)

(72) Inventors: Martin Bram, Juelich (DE); Robert Vassen, Herzogenrath (DE); Jesus Gonzalez, Aachen (DE); Diana Marcano, Edmonton (CA)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/084,230

(22) PCT Filed: Mar. 24, 2017

(86) PCT No.: PCT/DE2017/000074
§ 371 (c)(1),
(2) Date: Sep. 12, 2018

(87) PCT Pub. No.: WO2017/177995
PCT Pub. Date: Oct. 19, 2017

(65) Prior Publication Data
US 2019/0070818 A1    Mar. 7, 2019

(30) Foreign Application Priority Data
Apr. 13, 2016 (DE) .................. 10 2016 004 548

(51) Int. Cl.
B30B 15/06        (2006.01)
B22F 3/105        (2006.01)
(Continued)

(52) U.S. Cl.
CPC ............ B30B 15/065 (2013.01); B22F 3/105 (2013.01); B22F 3/11 (2013.01); B22F 3/15 (2013.01);
(Continued)

(58) Field of Classification Search
CPC .. B30B 15/065; B22F 3/15; B22F 3/16; B22F 3/11; B22F 3/105; B22F 2999/00;
(Continued)

(56) References Cited

U.S. PATENT DOCUMENTS 6,306,325 B1    10/2001  Kobayashi et al.
2002/0003318 A1*  1/2002  Kobayashi ............ C04B 35/581
                                                                      264/325
(Continued)

FOREIGN PATENT DOCUMENTS

DE    2739279 C2    3/1979
EP    2036693 A1    3/2009
(Continued)

OTHER PUBLICATIONS

Harona Diarra et al: "Investigating the effect of tablet thickness and punch curvature on density distribution using finite elements method", International Journal of Pharmaceutics, vol. 493, nr. 1-2, Sep. 1, 2015 (Sep. 1, 2015), pp. 121-128, XP055384530.
(Continued)

Primary Examiner — Jessee R Roe
Assistant Examiner — Rebecca Janssen
(74) Attorney, Agent, or Firm — Leydig, Voit & Mayer, Ltd.

(57) ABSTRACT

Disclosed is a method for producing a metal or ceramic component having regions of differing porosities. The method includes subjecting powder or a presintered precursor to a pressure-assisted pressing and sintering step, using at least one punch for the pressing step. The at least one
(Continued)

punch has a contact surface that is intended for making contact with the powder or the presintered precursor and that has a flat outer region and an inner region having a concave recess. After the sintering step, a component is obtained that has a flat outer compacted region having a first porosity and an inner porous region having a second porosity. The component has, on at least one side, a defined transition region between the outer region and the inner region.

20 Claims, 6 Drawing Sheets

(51) Int. Cl.
    *B22F 3/11*     (2006.01)
    *B28B 3/02*     (2006.01)
    *C04B 35/645*     (2006.01)
    *B22F 3/15*     (2006.01)
    *B22F 3/14*     (2006.01)
    *B22F 3/16*     (2006.01)

(52) U.S. Cl.
    CPC ............... *B22F 3/16* (2013.01); *B28B 3/021* (2013.01); *B28B 3/025* (2013.01); *C04B 35/645* (2013.01); *B22F 3/14* (2013.01); *B22F 2003/1051* (2013.01); *B22F 2999/00* (2013.01); *C04B 2235/666* (2013.01); *C04B 2235/775* (2013.01); *Y02P 40/63* (2015.11)

(58) Field of Classification Search
    CPC .. B22F 2003/1051; B22F 3/14; C04B 35/645; C04B 2235/775; C04B 2235/666; B28B 3/025; B28B 3/021; Y02P 40/63
    See application file for complete search history.

(56) References Cited

U.S. PATENT DOCUMENTS

2013/0140740 A1    6/2013    Micklash, II et al.
2015/0299052 A1*  10/2015  Allemand ............. C04B 35/195
                                      442/172

FOREIGN PATENT DOCUMENTS

GB            881204 A    11/1961
JP        2006045038 A    2/2006
WO  WO 2009004444 A2    1/2009

OTHER PUBLICATIONS

C. Selcuk, et al., "Joining processes for powder metallurgy parts: a review", Powder Metallurgy, vol. 53, nr. 1, Dec. 2010, pp. 1-5.

Alexander Laptev, et al., "Manufacturing of Metal Supported BSCF Membranes by Spark Plasma Sintering", Euro PM 2013 Congress & Exhibition, Proceedings, Sep. 15-18, 2013, pp. 1-6.

Olivier Guillon, et al., "Field-Assisted Sintering Technology/Spark Plasma Sintering: Mechanisms, Materials, and Technology Developments**", Advanced Engineering Materials, vol. 16, issue 7, Jul. 2014, pp. 830-849.

Ismaila Kayode Aliyu, et al., "Microstructure and Properties of Spark Plasma Sintered Aluminum Containing 1 wt.% SiC Nanoparticles", Metals 2015, vol. 5, Jan. 12, 2015, pp. 70-83.

* cited by examiner

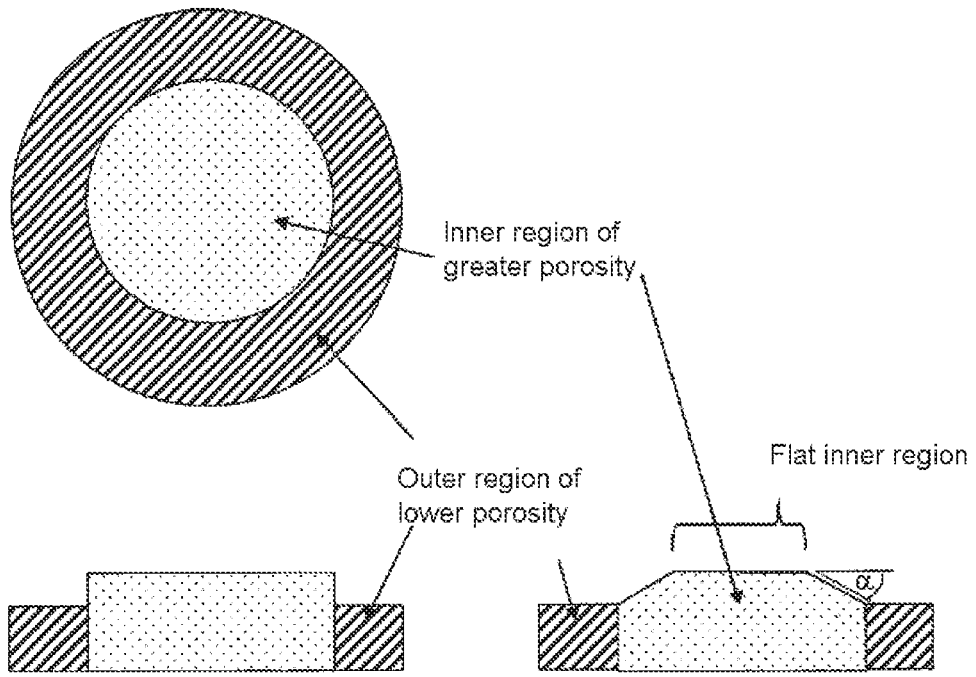
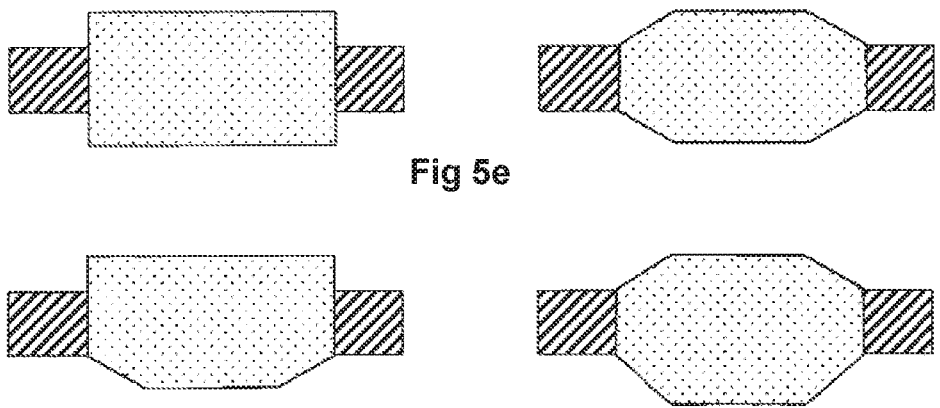

METHOD FOR PRODUCING METAL OR CERAMIC COMPONENTS AND COMPONENTS

CROSS REFERENCE TO RELATED APPLICATIONS

This application is a U.S. National Stage Application under 35 U.S.C. § 371 of International Application No. PCT/DE2017/000074 filed on Mar. 24, 2017, and claims benefit to German Patent Application No. DE 10 2016 004 548.5 filed on Apr. 13, 2016. The International Application was published in German on Oct. 19, 2017, as WO 2017/177995 A1 under PCT Article 21(2).

FIELD

The invention relates to a new method for producing a component, in particular a metal or ceramic substrate for a proton-conducting membrane or for an oxygen ion-conducting fuel cell or electrolytic cell. The invention also relates to components that can be produced using this method and that comprise regions of differing porosities.

BACKGROUND

Various methods currently exist for producing porous or dense substrate bodies. Sintering methods are generally based on parameters that accelerate pressing of the material that is initially more or less porous. Heat-treating prepressed molded parts made of fine materials, in particular powders, is considered to be sintering, as a result of which solid metal or ceramic parts having precisely defined dimensions and properties can be produced.

One particular production engineering method, in which powders and solids, especially ceramics and metals, are simultaneously hot-pressed and sintered, is hot isostatic pressing (HIP). In this method, the component to be produced is placed in a heatable pressure vessel. The component is pressed under inert gas or technical air at temperatures of up to 2000° C. and pressures of from 100 to 350 MPa. Since the pressure acts on the workpiece from all sides, the very dense component produced displays isotropic properties.

The disadvantages of this method are the high manufacturing costs and large restrictions with regard to the dimensional tolerance achievable. The main field of use of the HIP method is for pressing encapsulated powders and for repressing metal and ceramic workpieces that have already been sintered.

JP 2006 045038 A, for example, thus discloses a method for producing a metal or ceramic component, in which the component is produced from powder inside a drum mold, under pressure and at a high temperature, by means of two molding tools. The component has preferably the shape of a biconvex lens with a flat edge.

It has also proven advantageous for a pressing process for an electric field to also be applied to the material to be sintered during the exertion of pressure, so that the material heats up by means of what is known as the Joule effect (resistive heating as a result of a current flowing over the component or press insert).

A method that takes advantage of this knowledge is field assisted sintering technology/spark plasma sintering (FAST/SPS). These relate to a sintering method that is comparable to hot pressing and can be carried out under inert gas, in a vacuum or in air.

The advantages of the FAST/SPS method are the very steep heat and cooling ramps of up to 1000 K/min in combination with short holding times, which overall lead to considerably shorter processing times and very effective pressing of more than 90% of the theoretical density. Furthermore, when using powders having particle sizes in the nanometer range, this nanostructuring can often be maintained since an increase in particle size is generally prevented due to the short processing times. Diffusion induced by an electric field also appears to be possible [1].

A typical device for carrying out a FAST/SPS method is shown in FIG. 1. The material to be sintered (metal or ceramic) is usually poured into an electrically conductive die in powder form, which is generally made of graphite and is currently most commonly in the shape of a hollow cylinder. The material is prepressed by means of two pressurized punches, which are generally also made of graphite and are precisely adapted to the hollow-cylindrical geometry of the crucible. This is followed by the actual pressing step (sintering step) in an SPS machine. Here, a hydraulic press is used to exert a defined pressure on the punch. This step can take place under inert gas and in a vacuum.

The components that can be produced by means of such a method generally have a prismatic or cylindrical shape, the two bases of the components generally being parallel to one another, the two bases usually having a congruent geometry and the lateral face(s) being perpendicular to the base.

Unlike with hot pressing, in which the required sintering temperature is provided by an external heat supply, in FAST/SPS methods the material to be sintered is heated up by a pulsed current or by a direct current having current strengths of typically a few kiloamperes and a voltage of a few volts.

If the powder is a conductive powder, the current pulse is directly conducted through the die and through the powdery material, both heating up due to the ohmic resistance. In order to directly heat the powder, said powder needs to be sufficiently electrically conductive.

If the powder is a non-conductive powder, the current pulse is directly conducted through the die so that said die is heated first of all, and the powder in the die is then also heated by means of thermal conduction.

The FAST/SPS method is generally used for pressing metal or ceramic materials, which initially exist as a powdery starting material. Furthermore, the method is also used for rapid pressing in cases when problems occur during the sintering process, for example in metal powders that tend to form stable oxide layers.

The FAST/SPS method could therefore be used to successfully produce high-density aluminum alloys [2].

At the same time, the FAST/SPS method was used to successfully produce porous metal carriers from NiCoCrAlY powders, which are suitable for use as membranes [3].

Proton-conducting membranes are normally used for separating gases. Gas-separation membranes are generally used to separate desirable components from a gas flow, such as gas molecules, oxygen ions or protons. Substrate-assisted fuel cells and electrolytic cells are used for generating energy in an energy-efficient manner or for producing Hz. The metal or ceramic substrates used for these applications typically have a porosity of between 15 and 40 vol. %. In this case, the porosity should be as high as possible in order to keep the gas transport resistance through the membrane as low as possible.

On a laboratory scale, such membranes having diameters of approximately 15 mm are typically installed in a reactor and are sealed at the edges by means of gold rings. Under test conditions of from 800 to 1000° C., the gold rings advantageously soften and thereby allow for a perfect seal between the membrane and the reactor housing. Gas is thereby only transported via the membrane.

On an industrial scale, in which the membranes have considerably larger dimensions, a very effective seal is likewise required between the membrane and the gas-tight housing in order to prevent uncontrolled gas transport and gas exchange between the feed stream and the permeate side. For this purpose, the metal-carried or ceramic-carried membrane can be sealed by means of either solid phase sinter processes or liquid phase processes [4].

Diffusion bonding is the preferred method from the field of solid phase sintering and can be used for sealing both metal and ceramic components. However, the long processing times, high pressure and high temperatures can lead to further pressing of the porous membrane, which disadvantageously leads to an increased gas flow resistance.

In the liquid phase processes, a differentiation is made between soldering methods and welding methods. Soldering methods using glasses or metal-based solders can preferably be used for metal and ceramic carriers, whereas welding methods can only be used for metal carriers. In general, both soldering and welding methods involve problems when used with porous materials, since the liquid phases produced can be easily transported through the pore structure due to capillary forces. This can, in turn, disadvantageously lead to the pores being partially closed and to a geometrically undefined weld seam. Examples of this include the formation of gaps in an incomplete weld seam on the one hand, or, on the other hand, the formation of a concave depression in the weld seam when the molten phase penetrates the pore structure adjacent to the weld seam. Such irregularities in the weld seam are difficult to coat with a membrane material, since the risk of the formation of cracks in these regions is normally increased.

Various welding techniques, such as gas tungsten arc welding, inert-gas welding, electron-beam welding or laser welding are already used to produce membrane reactors [4].

In arc welding, pores in the weld seam can be enclosed. In this case, extensive heat affected zones (HAZ) are often also formed. In electron-beam welding and laser welding, smaller amounts of heat are introduced than in arc welding, and therefore only smaller heat affected zones are produced, too. In these heat affected zones, a disadvantageous growth in particle size and/or phase transformations often occurs. This generally leads to warpage stress and distortion at the boundaries, which adversely affect the stability and dimensional stability of the component. In addition, heat affected zones have a disadvantageous effect on the homogeneous distribution of the alloy elements in the metal substrate and the adjacent, gas-tight components of the membrane reactor housing. A change in the composition of the alloy both in and near to a weld seam can, in turn, significantly reduce the corrosion resistance of the metal substrate and the feed.

SUMMARY

In an embodiment, the present invention provides a method for producing a metal or ceramic component having regions of differing porosities. The method includes subjecting powder or a presintered precursor to a pressure-assisted pressing and sintering step, using at least one punch for the pressing step, the at least one punch having a contact surface that is intended for making contact with the powder or the presintered precursor and that has a flat outer region and an inner region having a concave recess, which, proceeding from the flat outer contact surface, includes at least one flank at an angle of $0 < \alpha \leq 90°$. The sintering step is assisted by an electric field. After the sintering step, a component is obtained that has a flat outer compacted region having a porosity of less than 5 vol. % and an inner porous region having a porosity of between 10 and 60 vol., the component having, on at least one side, a defined transition region between the outer region and the inner region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 5a) through 5g) show cross sections of components according to an embodiment of the invention;

DETAILED DESCRIPTION

Figure 1:
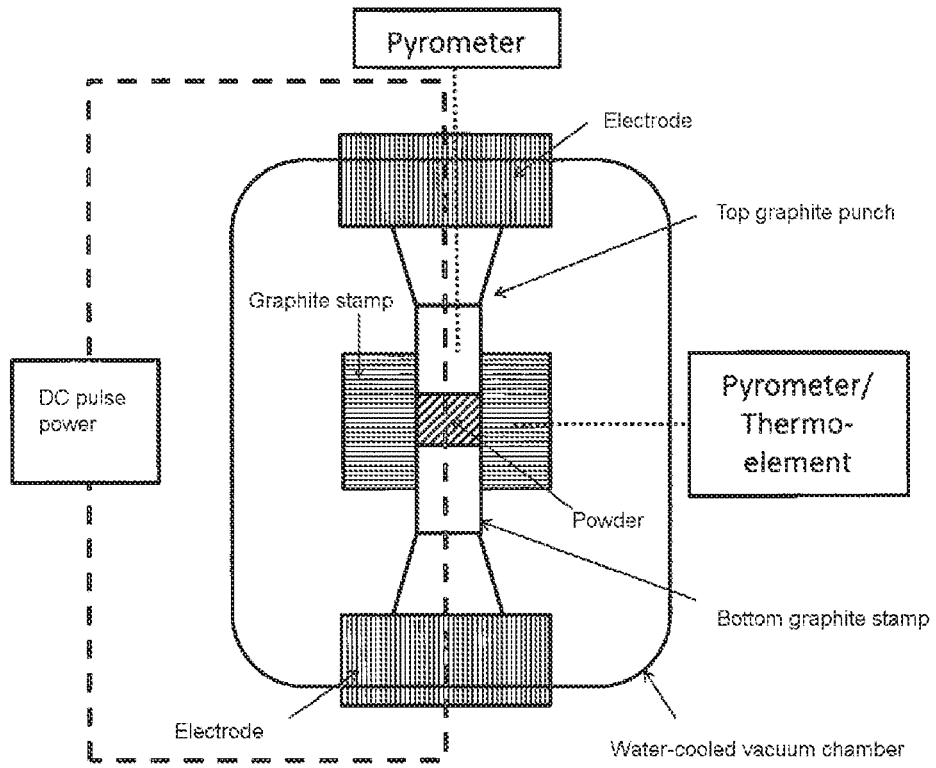
FIG. 1 shows a structure of a system for field-assisted sintering/spark plasma sintering.

Embodiments of the invention provide methods for obtaining porous metal or ceramic carrier substrates in the form of components having a surface, which is preferably planar on one side and does not comprise any gaps or depressions, in order to accurately apply a membrane layer, as is required for proton-conducting gas-separation membranes or oxygen ion-conducting fuel cells or electrolytic cells, without, however, comprising the disadvantageous heat affected zones and the geometrically undefined weld seams, as occur during the previously required post-treatment and pressing of components when connecting them to a housing.

Embodiments of the invention also provide methods by which metal or ceramic carrier substrates can be produced such that, as early as during the production process, regions of differing porosity are produced, which are designed to be dense/porous at the boundary surface in order to allow for error-free membrane coating.

Methods according to embodiments of the invention also advantageously prevent, or at least reduce, the formation of heat affected zones, in order to reduce the earlier disadvantages caused by stresses, distortions or corrosion susceptibility.

Furthermore, methods according to embodiments of the invention can be scaled by an order up to an industrial scale in order to produce metal or ceramic carrier substrates for use in membrane reactors.

According to embodiments of the invention, disadvantages of the prior art for producing a metal and/or ceramic substrate, in particular to be subsequently coated with a membrane, can be overcome by combining a sintering method comprising superposed pressure with at least one geometrically adapted punch. In methods according to embodiments of the invention, a superposed electric field can optionally be used for this purpose as well. Possible pressure-assisted methods can include, in particular, hot pressing or, particularly advantageously, field assisted sintering technology/spark plasma sintering (FAST/SPS).

According to embodiments of the invention, during the pressing or sintering process, the use of a punch having a geometrically modified contact surface, in particular having a negative hollow shape, leads to the material (substrate) to be sintered being pressed to different extents, and to regions of differing porosities simultaneously forming in the component produced as a result.

According to embodiments of the invention, the punch has a specially adapted geometry, such that the surface of the punch, which is intended for making contact with the powder to be pressed and is referred to as the "contact surface" in the following, has, in addition to a flat outer region, an inner region that comprises a concave recess with respect to the plane formed by the outer region (see also FIG. 3 in this regard).

Due to the use of a punch having a contact surface that is geometrically modified in this way, it is possible for different pressures to already act on the substrate to be pressed during the pressing and sintering process, which consequently form different regions of differing porosities.

In the component to be produced, the boundary line between the flat outer region of the punch and the inner region, which comprises a concave recess, defines the boundary surface between a less porous region and a more porous region, which is termed "porous/dense boundary surface" in the following.

In this case, the concave recess in the inside of the contact surface of the punch is defined in particular by at least one flank, which is/are arranged so as to proceed from the flat outer contact surface (outer region) at an angle $\alpha$ where $0 > \alpha \geq 90°$. According to the invention, an undercut, i.e. a flank angle $\alpha$ of more than 90°, is not provided.

The greater the flank angle, the greater the concave recess and thus the pressure difference that acts on the powder to be pressed, during the pressing and sintering process, between the outer region of the punch comprising the flat contact surface and the inner region thereof comprising the concave recess. However, a very large pressure difference can lead to undesirable stresses in the component, in particular at the porous/dense boundary surface, when producing the component, and therefore a flank angle of between 15° and 75°, preferably of between 45° and 60°, should preferably be set.

In general, the use of a punch having a geometrically modified contact surface leads to a component that has at least two regions of differing porosity, the less porous outer region being distinguished from the more porous inner region by a clearly defined dense/porous boundary surface.

Depending on the flank angle $\alpha$, a pressure gradient forms on the material to be sintered during the sintering process, in the region of the flanks, which gradient generally leads to the porosity of the inner region of the component produced also having a gradation.

Figure 3:
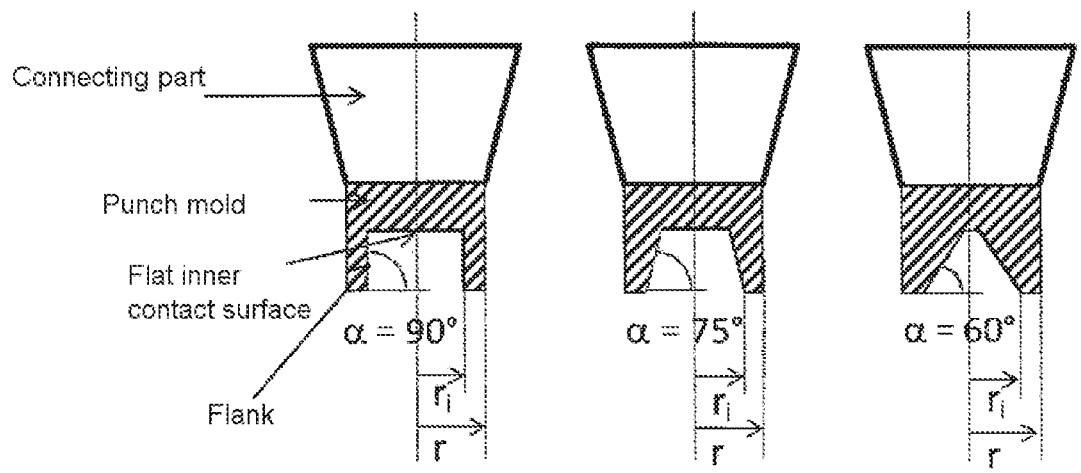
FIG. 3 shows suitable geometries of components according to an embodiment of the invention.

In addition to the flank(s), the inner region, i.e. the concave recess, preferably, but not necessarily, comprises an additional region that is parallel to the flat, outer contact surface and is referred to as the "flat inner contact surface" (see FIG. 3 in this regard).

During the sintering process, a constant pressure is exerted on the material to be sintered in this flat inner region, and therefore the flat inner region of the component produced normally has a uniform porosity.

By way of a method according to an embodiment of the invention, a component can therefore advantageously be produced in one production step, which has, on the one hand, a flat outer more strongly compacted region and, on the other hand, an inner, less strongly compacted region, the inner region preferably also being flat, at least in one region.

Examples of suitable geometries of components produced according to an embodiment of the invention are shown schematically in FIG. 3.

Such a component having differing porosities and in particular having a flat inner region can preferably be used as a carrier for a membrane, the flat, inner highly porous region in particular being intended for the application of the membrane layer and the outer flat compacted region being intended for connection and sealing to a housing, e.g. a membrane reactor. Therefore, the compacted outer region of the component produced according to the invention, to which a membrane layer is optionally applied, can considerably simplify the gas-tight integration of such a carried membrane in a membrane reactor.

For a component that is intended to be used as a carrier for a membrane, it is advantageous for the flat outer compacted region to have a porosity of less than 5 vol. %, in particular of less than 2 vol. %, and preferably of less than 1 vol. %. In contrast, the component should have a porosity of between 10 and 60 vol. %, in particular between 20 and 55 vol. % and preferably between 30 and 50 vol. % in the inner, more porous region and in particular in the flat inner region. These stated amounts do not explicitly relate to the respective porous-dense transition regions, which have, in this respect, a graded porosity that accordingly lies between the porosity of the flat outer compacted region and of the inner more porous region.

The design of the punch, in particular the geometry of the contact surface, which is the chief determinant of the dimensions of the component, and the geometry of the inner concave region, which defines the region of the component that is less porous, can be accordingly selected by a person skilled in the art, according to requirements.

In one embodiment of the invention, the punch has a circular contact surface, for example. In addition, stamps having a different contact surface geometry are, however, also conceivable. These also include a triangular, square or rectangular contact surface or other polyhedral contact surfaces, for example.

In another embodiment of the invention, a punch is used, the concave inner region of which is circular. Such a recess can, for example, be formed by a single concentric flank having an angle $\alpha$ of greater than 0° and less than 90°.

The chosen geometry of the contact surface and of the inner concave region of the punch may correspond, but does not have to. Punches having a circular contact surface and a circular inner concave region are therefore conceivable, but also punches having a square contact surface and a circular inner concave region, or a punch having a circular contact surface and an octahedral inner concave region.

The inner region comprising the concave recess is advantageously, but not necessarily, arranged in the center of the contact surface of the punch.

The relationship between the outer region and the inner region can in principle be freely selected depending on the intended use. However, in order to ensure sensible application, the outer region should generally not be smaller than 2 mm, as problems may otherwise arise with regard to the stability of the punch.

In principle, it is also possible to generate a plurality of porous regions in one plane of a component similar to a perforated plate in which the holes are filled with a porous material. In this respect, a punch that is suitable for this purpose would comprise a plurality of inner regions each comprising a concave recess. Such a structure could therefore be of interest for use as a membrane module, despite having a reduced throughput rate, due to its improved stability.

In another advantageous embodiment, the punch has a flat inner contact surface, which makes up at least 50%, preferably more than 70%, and particularly advantageously more than 90%, of the surface area of the inner region. Such an embodiment can be selected when a component is to be produced as a carrier for a membrane, in which very high throughputs are desirable and the stability is only of secondary importance in this respect.

In another advantageous embodiment of the method, depending on the method used, not only one but two punches that are modified according to the invention can be used that apply a force to the powder to be pressed, which is in the die, from two sides.

It is therefore preferably possible to produce a component having an even more complex surface geometry in one single method step, which component also comprises different regions having differing porosities.

The components that can be produced by means of the method according to the invention generally have a prismatic or cylindrical shape, the two bases of the components generally being parallel to one another, the two bases usually having a congruent geometry and the lateral surface(s) being perpendicular to the base. In addition, these components comprise an inner region having a convex curve (in the form of a negative shape with respect to the punch used in each case) on either or both of the bases, which curve preferably also have a flat region that is parallel to the bases. In this case, the geometry of the bases corresponds to the contact surface of the punch used and can assume in particular a circular, oval, square, rectangular or other polygonal shape.

When using the components as a metal and/or ceramic substrate, which are in particular to be subsequently coated with a membrane, components having a square or rectangular shape have proven to be particularly advantageous.

Depending on the geometric requirement for optimum integration in the membrane reactor, when using two contoured punches, these punches can either have the same contour (see the corresponding component cross section in FIGS. 5d) and 5e)) or have a different contour (see the corresponding component cross section in FIGS. 5f) and 5g)).

In this case, when two punches are used, the inner regions can be independently selected to be different sizes, different geometries can be selected for the inner regions, different flank angles α can be selected for the respective inner regions and different sized flat inner regions can also be provided.

Pressing the pore structure towards the porous-dense transition region due to the angle in the punches should not be an issue with regard to the subsequent coating process. An optional increase in the roughness of the dense edge region, for example by means of sandblasting, can be an advantage for the coating adhesion.

In this respect, by means of the method according to the invention, by selecting suitable punches a plurality of possible variations of the shape and geometry and therefore the porosities generated inside the components to be produced can advantageously be set.

For use as a carrier structure for proton- or oxygen ion-conducting membranes, the cross sections in FIGS. 5a) and 5b) in particular are preferred, since the arrangement of the membrane coating on the planar end face (that does not have any gaps and concave depressions) here provides the best prerequisite for error-free coating of the membrane. Furthermore, expanding the geometry of the membrane coating beyond the porous/dense boundary surface and up to the compacted edge region of the substrate reliably ensures that the membrane is sealed in the manner required for operation.

The temperatures required for the above-described methods can be provided both by an external heat source and internally by means of an adjustable current flow. In this case, different heating and cooling rates generally occur, which affect the build-up and decrease of pressure and the course of the sintering processes differently.

In a particularly advantageous embodiment of the invention, the fast heating and cooling rate known for the field assisted sintering technology/spark plasma sintering method is combined with a pressure build-up on the material to be sintered, whereby at least one specially adapted punch is used such that different regions of differing porosities are already formed when a substrate is sintered. In particular, by means of a FAST/SPS method, the method according to the invention allows for extremely effective production—due to the fast nature thereof—of porous substrates having compacted edges in one or two process steps.

In contrast to the material to be pressed, the moveable punches typically used until now in hot pressing or spark plasma sintering comprise a circular level flat contact surface having a radius r, by means of which contact surface the powder is compressed and pressed inside a mold, usually from two sides. If the plane between the material to be pressed and the punch surface is considered to be a starting surface, the flat punch contact surface is at an angle of 0° relative thereto. A corresponding graphic depiction is shown in FIG. 3).

The punch according to the invention can itself advantageously also be made up of several parts. In an advantageous embodiment of the invention, the punch comprises a first part (punch mold), for example, which is perpendicular to the pressing direction, is intended for making contact with the material to be pressed, and the surface of which has a specially adapted geometry according to the invention, and a second part (connecting part), which guarantees the contact between the punch mold and optionally the rest of the pressing device or an electrode. This embodiment is indicated in FIG. 3, for example.

A multipart embodiment of the punch is advantageous in that, depending on the application, different punch molds can quickly be inserted without the entire punch, or connecting part, also having to be exchanged for this purpose.

Figure 2:
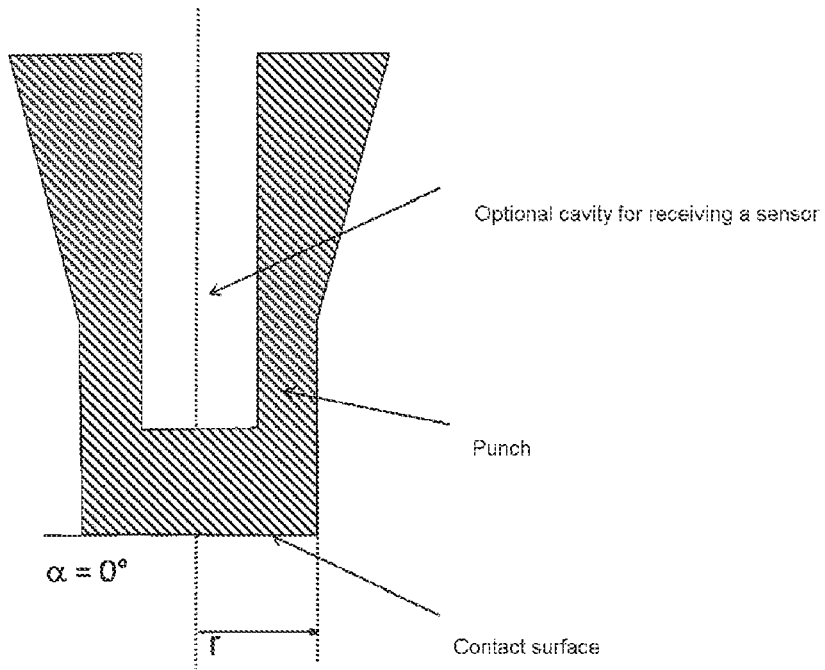
FIG. 2 shows a punch according to an embodiment of the invention.
Figure 4:
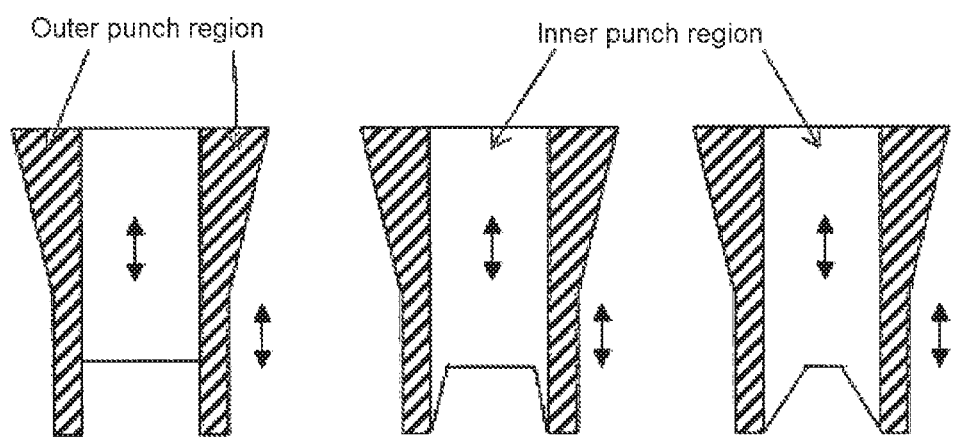
FIG. 4 shows punches according to embodiments of the invention.
Figure 6:
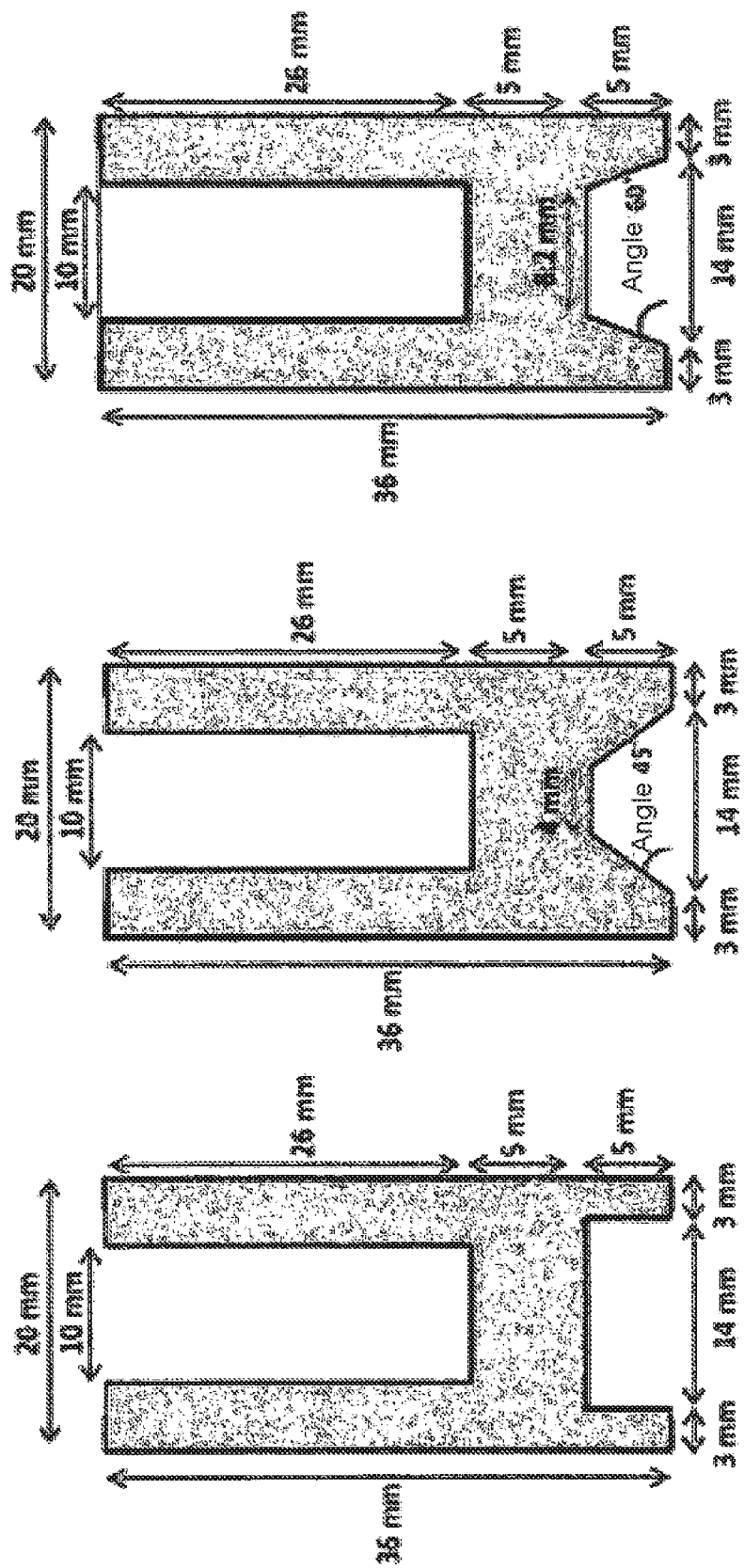
FIG. 6 shows punches according to embodiments of the invention.

The connecting part and optionally also the punch mold can be solid or optionally also comprise cavities for receiving one or more measuring probes or for generating the measurement signal (pyrometer), as is shown schematically in FIG. 2 but is not shown in the embodiments according to the invention in FIGS. 3 and 4. Such a hole or cut-out is advantageous in that the temperature measurement required for carrying out the sintering process in a controlled manner can be carried out as close to the sample as possible. Either a thermoelement (for measuring above room temperature) or a pyrometer (for measuring above temperatures over 500° C.) is used for the temperature measurement.

Another advantageous embodiment of a multipart punch involves dividing the punch, as is known from the classic pressing techniques, in the longitudinal direction, i.e. in parallel with the pressing direction, so that the outer punch region (hollow-cylindrical punch mold) and of the inner punch region (cylinder having a flat end face or having a depression and flank angles, as shown in FIG. 4) can move independently provided that the FAST/SPS systems technology is suitably designed. This embodiment of the punch allows different pressures to be advantageously set in the outer and inner region of the punch, thereby opening up additional degrees of freedom when producing the substrate geometries that are shown in FIG. 5 by way of example.

By selecting a punch or press molds each having a suitable punch geometry, the porous region of a component, to one side of which a membrane is to be subsequently applied, can be designed so as to be completely flat, without disadvantageous cavities forming. This significantly simplifies subsequent coating with a membrane material and consequently leads to the desired gas-tightness of the membrane in relation to the porous carrier substrate.

It should be mentioned here that, in an advantageous embodiment, coating with a membrane material is not restricted to the porous inner region, but is carried out up to the dense region. This reliably ensures that the membrane is sealed and that the gas compartments in the membrane reactor are separated.

In the method according to the invention, the starting powder is first introduced into a die that is sealed by means of one or two punches. By applying a preset force, a pressure $P_1$ is exerted on the material to be pressed by means of the punch or punches. An external heat source or an adjustable current flow is simultaneously used to heat the material to be pressed to a maximum temperature $T_1$.

By means of the surface geometry of the punch or punches, which geometry is adapted according to the invention, the powder to be pressed is simultaneously exposed to different pressures at different points. In this case, the flat outer contact surface of the punch normally applies a higher pressure to the powder than the concave inner region of the contact surface, as a result of which in particular a more porous inner region (index i) and a less porous outer region (index a) are formed.

The method can advantageously be carried out in a single method step, in which a maximum temperature $T_1$ and a force are preset, which then leads to different pressures $P_1$ at the powder to be pressed as a result of the contour of the punch, by means of which the powder to be pressed is pressed and sintered. FIG. 5a shows the corresponding temperature-pressure-time graph. In this case, the heating-up and cooling-down times vary normally with the source used for the heating capacity. When the FAST/SPS method is used, these times are generally very short. A schematic representation of the typical pressure and temperature profiles, as are typically set in a single-stage method, can be seen in FIG. 7a).

In one particular embodiment of the method, the starting powder can also be presintered (index v) first of all at a pressure $P_v$ and a maximum temperature $T_v$ using one or two conventional punches. Here, conventional punches are flat punches whereby the contact surface does not have a geometric design that is adapted according to the invention.

If presintering is carried out, the edge region is actually sintered, shaped and pressed by means of a second sintering step according to the invention, preferably, but not necessarily, in the same device, at least one punch according to the invention being used.

Figure 7B:
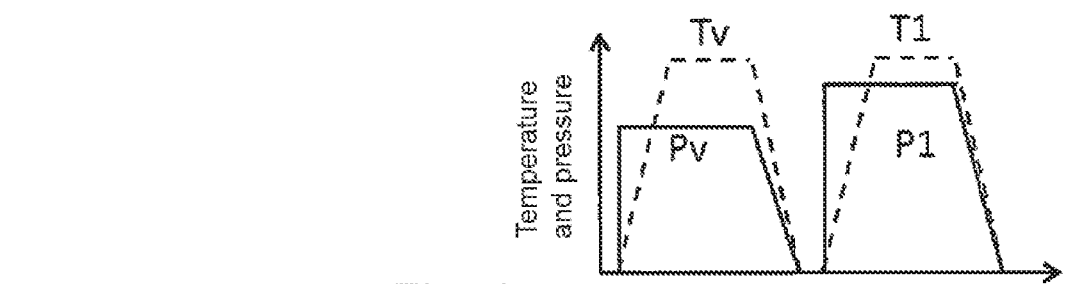
FIGS. 7b) through 7d) show corresponding temperature-pressure-time graphs for embodiments of the invention.
Figure 7A:
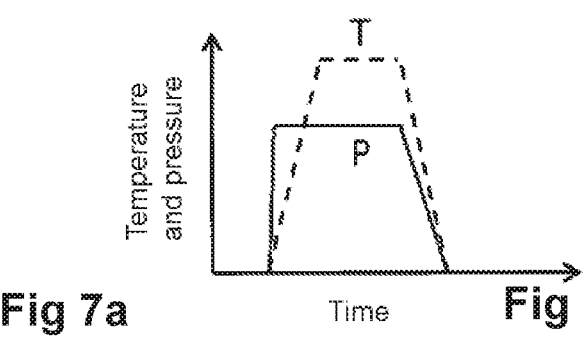
FIG. 7a) shows a schematic representation of typical pressure and temperature profiles, as are typically set in a single-stage method.
Figure 7C:
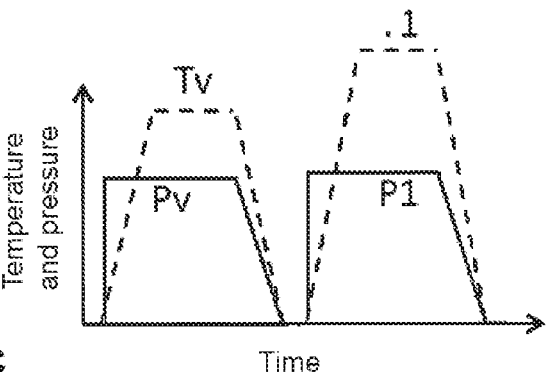
Figure 7D:
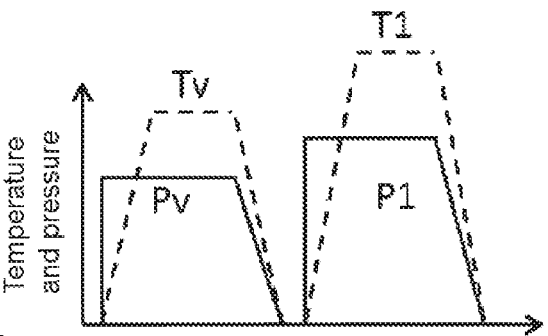

The following principle combinations of temperature and pressure can preferably be set for the sintering parameters for the second method step:
1) $T_1 = T_v$ and $P_1 > P_v$;
2) $T_1 > T_v$ and $P_1 = P_v$;
3) $T_1 > T_v$ and $P_1 > P_v$;

FIGS. 7b) to 7d) show the corresponding temperature-pressure-time graphs for the above-described variants 1-3.

The invention relates to a new method for producing a component, in particular a metal or ceramic substrate for a proton-conducting membrane or for an oxygen ion-conducting fuel cell or electrolytic cell, which component comprises regions of differing porosities different, in which region of differing porosities can advantageously already be produced in the component during the production method.

A metal and/or ceramic substrate produced by means of the method according to the invention comprises at least one inner porous region, which normally does not comprise any partially closed pores and does not display any heat affected zones either, which would be noticeable in a different composition or microstructure of the alloy elements.

Therefore, such a metal or ceramic substrate produced by means of the method according to the invention advantageously does not display a lower degree of stability or corrosion resistance than a substrate that is produced by means of conventional joining techniques either.

In addition, it has been found that, provided the process is conducted in a suitable manner, a substrate produced by means of the method according to the invention preferably does not have any residual stresses or distortions in the region of the dense/porous boundary surface.

Such a component can be used in particular as carrier for a membrane in a gas-separating device.

The structure of a system for field-assisted sintering/spark plasma sintering is shown in FIG. 1 and can be found in [1].

The powdery metal or ceramic material to be pressed in a spark plasma sintering system is poured into a graphite mold (die). Pressure is exerted on the two graphite punches from the outside. By applying a direct current or a pulsed current, the die is heated by means of resistive heating (Joule heating). If the powdery material itself is electrically conductive, said powder is advantageously also heated directly inside the material due to the ohmic resistance. If a powder that does not have its own electrical conductivity is used, it is generally embedded in an electrically conductive matrix and is heated indirectly by means of the matrix material.

The field assisted sintering technology/spark plasma sintering method has thus far been successfully used for the synthesis of dense metal or ceramic materials. The method is also advantageous when pressing materials that normally present difficulties when being sintered.

In an advantageous embodiment of the method, a bottom punch having a flat surface with a radius=r is used in a hollow-cylindrical mold, for example, while the top punch having a radius=r has a surface having a displaced ring with an internal radius $r_i$. In this respect, a smaller amount of pressure is exerted on the inner region of the material to be sintered than on the outer region during the pressing process.

The material that is below the outer annular region is compressed to a greater extent and is therefore pressed to a greater extent than the material in the inner region. As a result, a circular metal or ceramic substrate having a porous inner region that is also circular and having an annular dense outer region can advantageously be produced, in which the boundary between the porous and the dense region has a very well defined geometry.

In addition to an embodiment whereby the punch has a circular geometry, it is also possible to use square or rectangular punches and to introduce a contour therein that is described in accordance with that for the circular geometry. The geometry of the die also has to be adapted accordingly. The square or rectangular substrates, which are produced using this device and have a graded porosity, are advantageous for producing membrane reactors in terms of space utilization and flow distribution.

Embodiment 1

FIG. 4 shows a few embodiments of punches according to the invention, such as those used for an SPS system. In addition to a modified punch having a flank where $\alpha=90°$, punches are preferably used that have a less steep flank, i.e. where $\alpha=60°$ or $\alpha=45°$, for example. In all cases, a flat inner contact surface is provided, which allows for the production of a component having a flat porous region, to which a membrane can then preferably be applied, for example.

Embodiment 2

In a spark plasma sintering system (FAST/SPS), an NiCoCrAlY alloy (Oerlikon Metco, Amdry 386, Ni22Co17Cr12Al0, 5Hf0, 5Y0, 4Si) was poured in powder form into a graphite mold (crucible) having a diameter of 20 mm. The powder particles have a spherical geometry and were produced by means of gas atomization. The powder particles have an average diameter of 20 µm.

Pellets having a diameter of 20 mm were sintered in both one and two method steps, a flat (conventional) punch and a punch having a contact surface that is adapted according to the invention were used in each case. The samples were heated at a heating rate of 100 K/min and held at the maximum temperature for approximately 15 seconds, before being cooled back down.

The samples that were sintered in two method steps were heated to a maximum temperature of $T_v=875°$ C. at a pressure of $P_v=20$ MPa in the first step, and were heated to temperatures of $T_1=1000°$ C. in the second step.

The samples that were sintered in one method step were heated to a maximum temperature of $T_1=975°$ C. Pressures $P_1$ of around 50 MPa were reached in the outer annular region of the sample as a result of the modified punch.

The porosities of the inner and the outer region of the samples vary with the number of sintering steps. In both cases, however, each of the samples were found to have an inner porous region and an outer annular compacted region that is less porous, as shown in Table 1 below.

TABLE 1

POROSITIES IN DIFFERENT REGIONS OF A SAMPLE
(EACH PRODUCED ACCORDING TO THE INVENTION
BY MEANS OF A FAST/SPS METHOD)

| Sintering steps | Porosity in the inner region | Porosity in the outer region |
| --- | --- | --- |
| One sintering step where $T_1 = 975°$ C. | 20 vol. % | 8 vol. % |
| Two sintering steps where $T_v = 875°$ C. and $T_1 = 1000°$ C. | 10 vol. % | 0.4 vol. % |

Figure 8A:
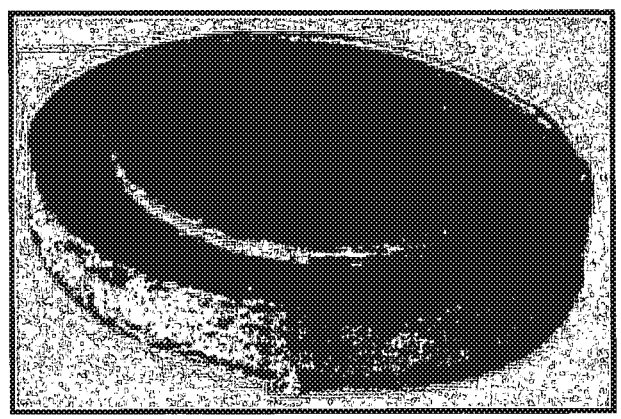
FIGS. 8a) through 8c) show results of a two-stage sintering method and images of the inner and outer region taken using a laser microscope.
Figure 8B:
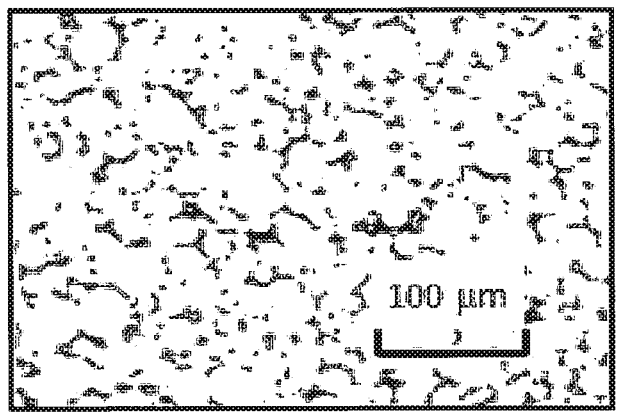
Figure 8C:
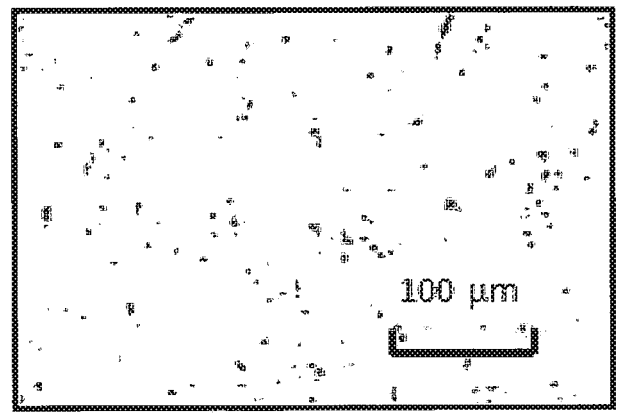

FIG. 8 shows the results of a two-stage sintering method and images of the inner and outer region taken using a laser microscope.

The outer annular more strongly compacted region and the boundary line between the more strongly compacted outer ring and the less strongly compacted inner region can clearly be seen in FIG. 8a). In FIGS. 8b) and 8c) black regions=pores and grey regions=metal matrix.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LITERATURE CITED IN THIS APPLICATION

[1] Guillon, O., J. Gonzalez-Julian, B. Dargatz, T. Kessel, G. Schierning, J. Rathel, and M. Herrmann, "Field-Assisted Sintering Technology/Spark Plasma Sintering: Mechanisms, Materials, and Technology Developments", Advanced Engineering Materials, 2014, 16(7): pp. 830-849.

[2] Aliyu, I., N. Saheb, S. Hassan, and N. Al-Aqeeli, "Microstructure and Properties of Spark Plasma Sintered Aluminum Containing 1 wt. % SiC Nanoparticles", Metals, 2015, 5: pp. 70-83.

[3] Laptev, A., M. Bram, M. Zivcec, S. Baumann, M. Jarligo, D. Sebold, E. Pfaff, and C. Broeckmann, "Manufacturing of Metal Supported BSCF Membranes by Spark Plasma Sintering", Euro PM2013 Congress and Exhibition, At Goteborg, Sweden, p. 3.

[4] Selcuk, C., S. Bond, and P. Woolin, Powder Metallurgy, 2010. 53(1): pp. 7-11.

The invention claimed is:

1. A method for producing a metal or ceramic component having regions of differing porosities,
    subjecting powder or a presintered precursor to a pressure-assisted pressing and sintering step,
    wherein at least one punch is used for the pressure-assisted pressing and sintering step, the at least one punch having a contact surface that is intended for making contact with the powder or the presintered precursor and that has a flat outer region and an inner region having a concave recess that, proceeding from the flat outer contact surface, includes at least one flank at an angle of $0<\alpha\leq 90°$,
    wherein the pressure-assisted pressing and sintering step is assisted by an electric field, and,
    wherein after the pressure-assisted pressing and sintering step, a component is obtained that has a flat outer compacted region having a porosity of less than 5 vol. % and an inner porous region having a porosity of between 10 and 60 vol. %, the component having on at least one side, a defined transition region between the outer region and the inner region.

2. The method according to claim 1, wherein the at least one punch has a circular, oval, square, rectangular or polygonal contact surface.

3. The method according to claim 1, wherein the at least one punch has at least one circular, oval, square, rectangular or polygonal inner region having a concave recess.

4. The method according to claim 3, wherein the at least one punch has at least one inner region having a concave recess including at least one flank having an angle $\alpha$ of between 15° and 75°.

5. The method according to claim 1, wherein the at least one punch includes a circular inner region in a center thereof, which has a concave recess having a flank having a constant angle $\alpha$.

6. The method according to claim 1, wherein the at least one punch includes at least one inner region having a concave recess having a flat inner region in portions, which is oriented in particular in parallel with the contact surface of the flat outer region.

7. The method according to claim 1, wherein two punches having a contact surface are used, each of which comprises a flat outer region and an inner region having a concave recess, which, proceeding from the flat outer contact surface, comprises at least one flank at an angle of $0<\alpha\leq 90°$.

8. The method according to claim 1, wherein the contact surface defines multiple separate concave recesses arranged to produce multiple separate regions of greater porosity in a plane of the component such that each of the multiple separate regions of greater porosity is separated from the other one or more regions of greater porosity by one or more regions of lesser porosity;
    wherein the inner porous region serves as one of the regions of greater porosity and the flat outer compacted region serves as at least a portion of the one or more regions of lesser porosity.

9. A metal or ceramic component, which has a prismatic or cylindrical shape and different porosities, comprising:
    a flat outer compacted region having a higher density and an inner porous region comprising at least one convex raised portion and having a lower density; and
    on at least one side, a defined transition region between the flat outer region and the inner region,
    wherein the flat outer compacted region has a porosity of less than 5 vol. % and the inner porous region has a porosity of between 10 and 60 vol. %.

10. The component according to claim 9, further comprising a circular inner region.

11. The component according to claim 9, which has a cylindrical shape, wherein the flat outer region is in the form of a ring.

12. The component according to claim 9, which has a prismatic shape.

13. The component according to claim 10, wherein the circular inner region includes a flank having a constant angle $\alpha$.

14. The component according to claim 10, wherein the circular inner region includes a flank having an angle $\alpha$ of between greater than 0° and 90°.

15. The component according to claim 9 which includes, on two opposite sides, a flat outer region and at least one inner region having a convex raised portion.

16. The component according to claim 15, wherein the at least one inner region having a convex raised portion comprises a flat inner region.

17. The component according to claim 9, wherein the flat outer compacted region has a porosity of less than 2 vol. %.

18. The component according to claim 9, wherein the inner porous region has a porosity of between 20 and 55 vol. %.

19. The method according to claim 1, wherein the flat outer region of the contact surface is configured to be movable relative to the inner region of the contact surface, and
    wherein the pressure-assisted pressing and sintering step comprises moving the inner region of the contact surface with respect to the flat outer region of the contact surface so as to apply a pressure by the inner region of the contact surface against the powder or presintered precursor that is different a pressure applied by the flat outer region of the contact surface, both regions of the contact surface simultaneously contacting the powder or presintered precursor during the pressure-assisted pressing and sintering step.

20. The method according to claim 1, wherein the punch is hollow to define a cavity in which a measurement probe is disposed.

* * * * *